Patented Aug. 21, 1934

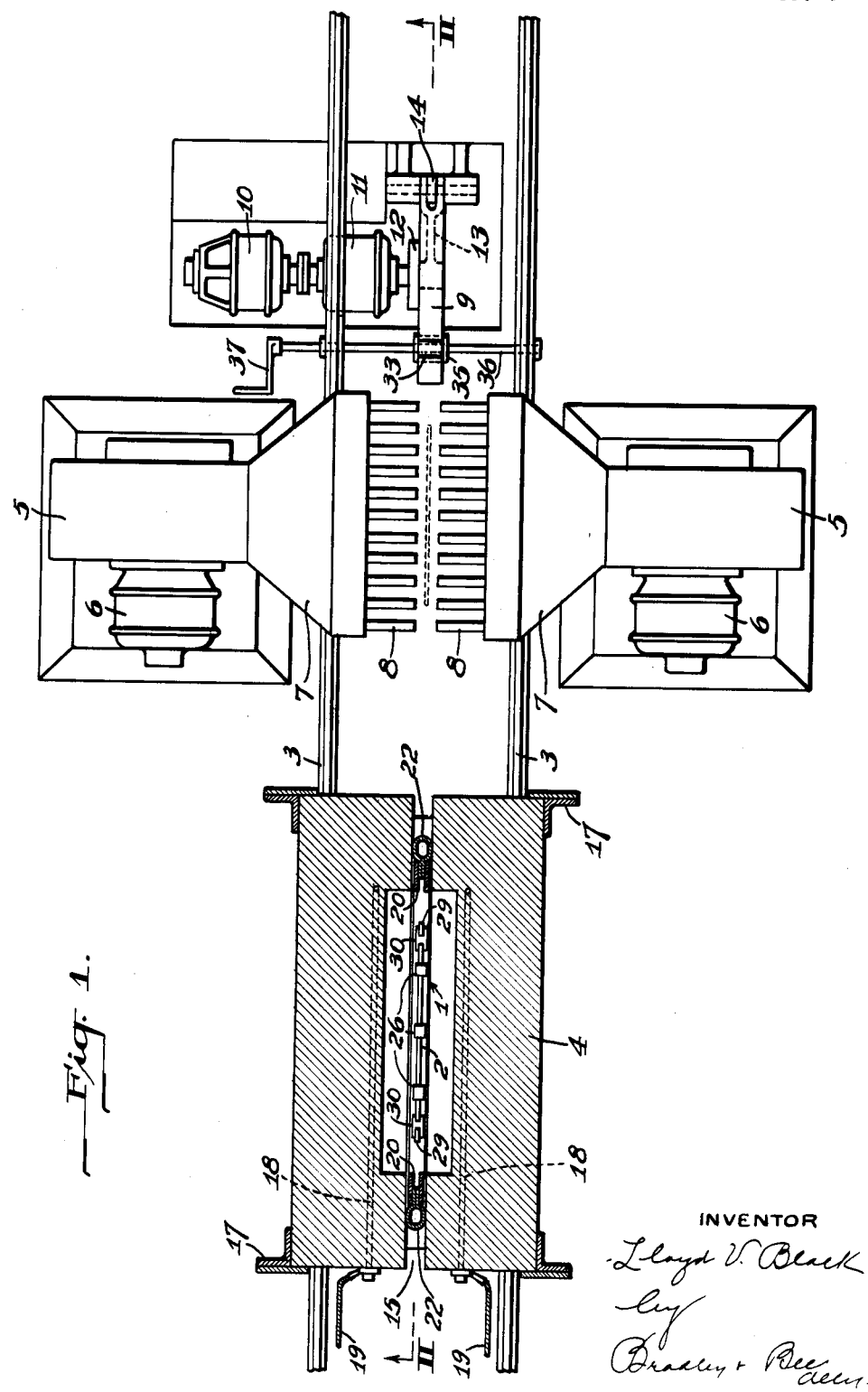

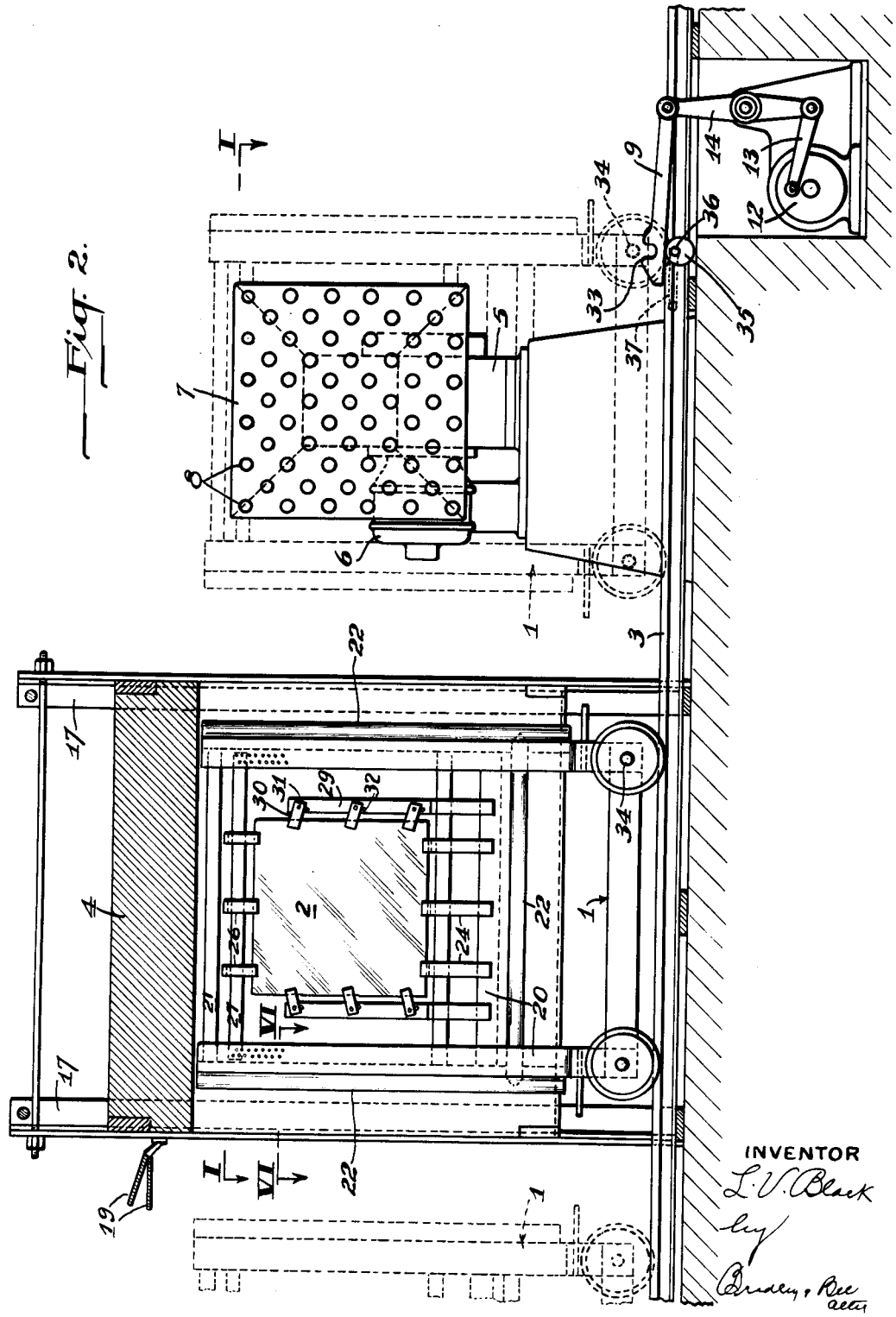

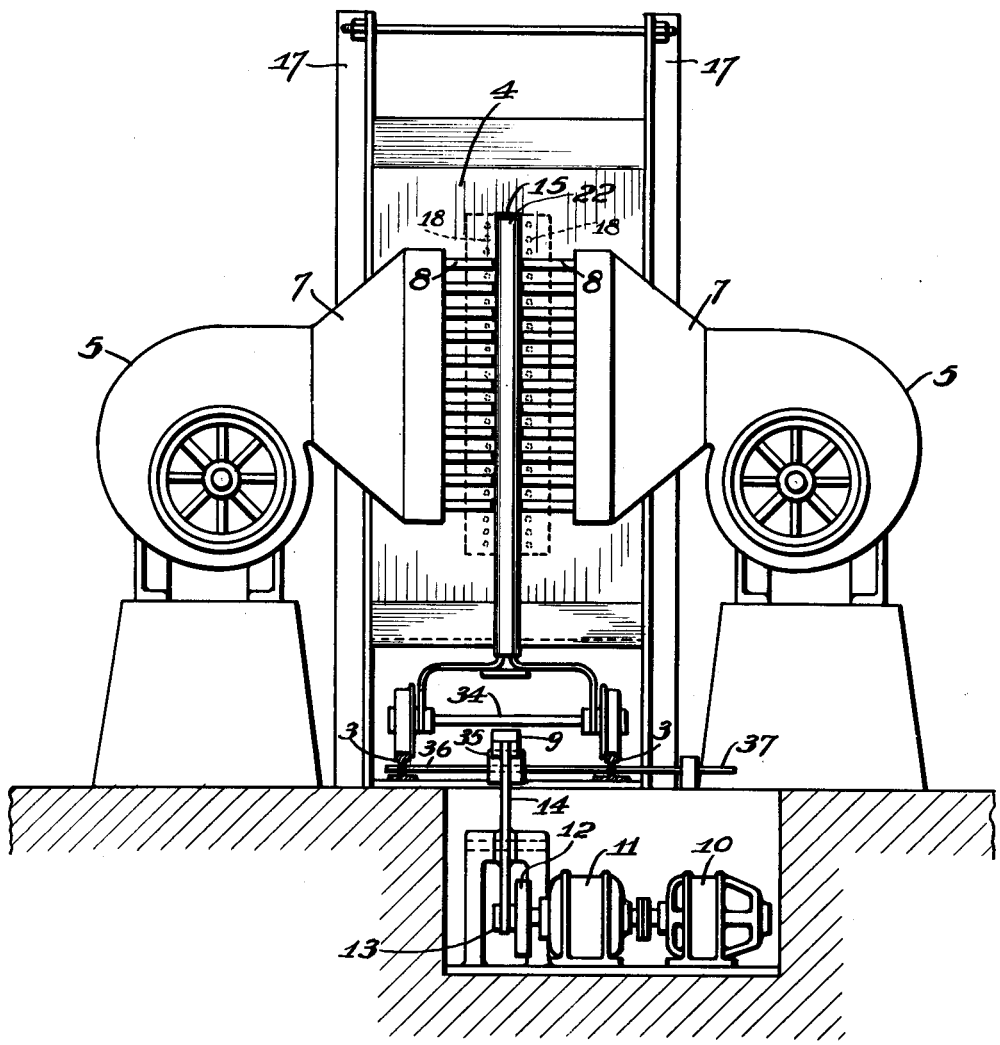

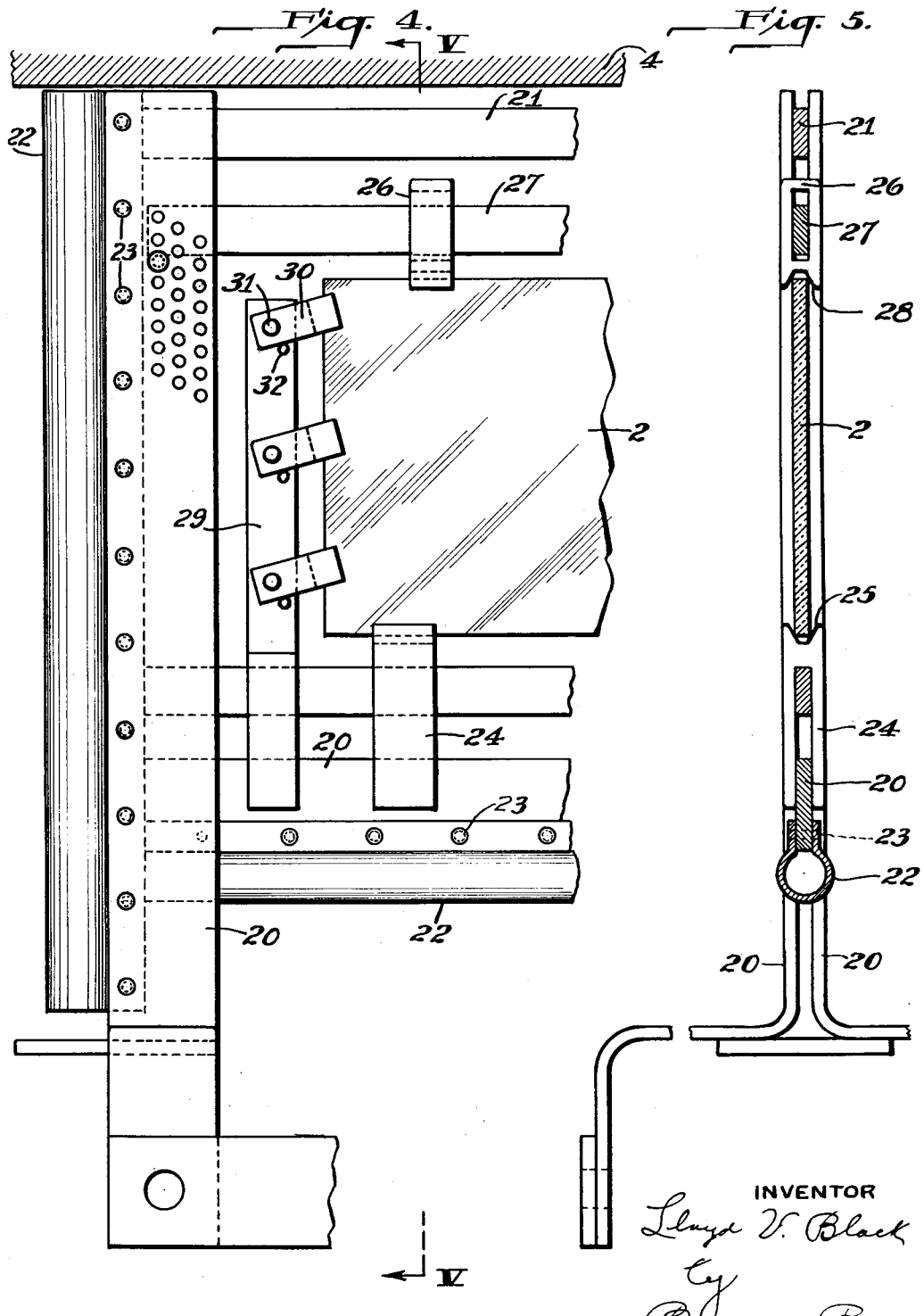

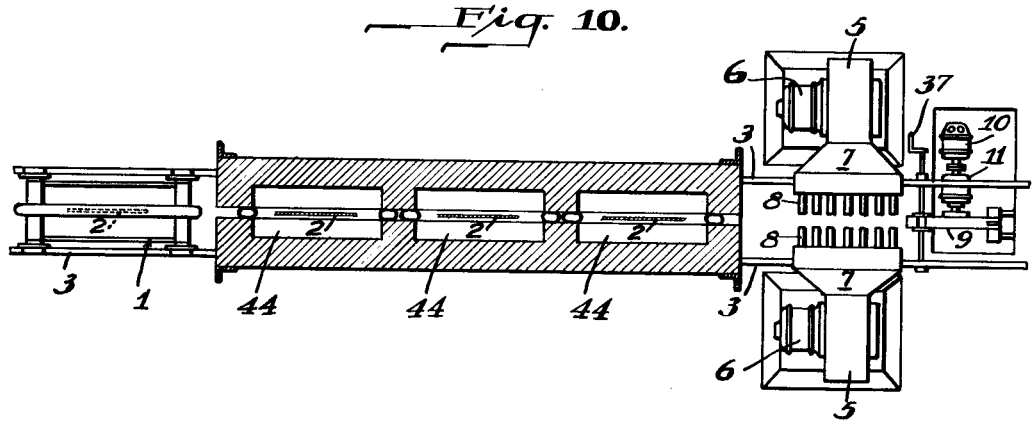
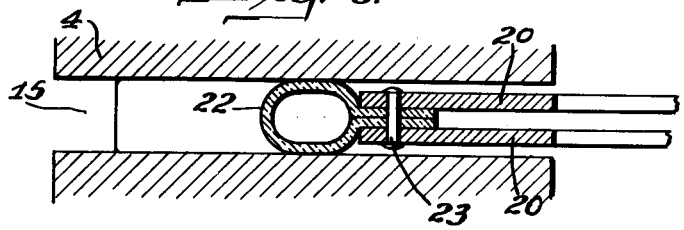
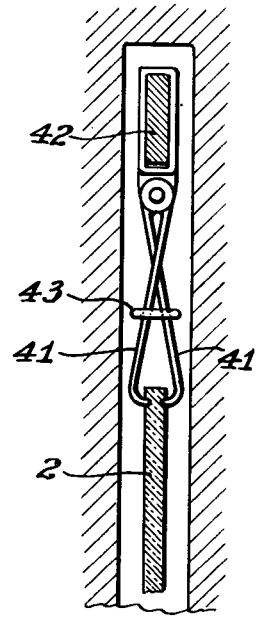
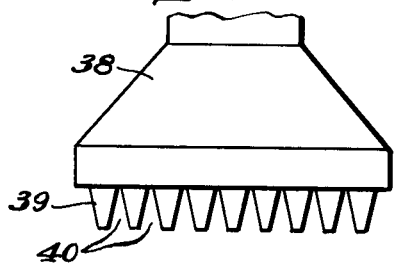
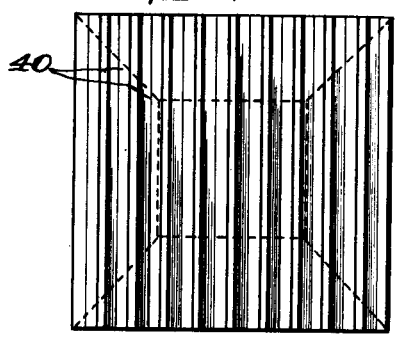

1,970,730

UNITED STATES PATENT OFFICE 1,970,730

APPARATUS FOR CASE HARDENING GLASS

Lloyd V. Black, Tarentum, Pa., assignor to Pittsburgh Plate Glass Company, a corporation of Pennsylvania Application January 28, 1932, Serial No. 589,354

10 Claims. (Cl. 49—45)

The invention relates to apparatus for case hardening glass so that its strength is greatly increased, as well as its thermal resistance. Glass of this description has many uses, one of the most important being as automobile lights due to the safety factor, since this glass is not only much more resistant to breakage than ordinary glass, but when it does break, it crumbles to very fine particles which have little or no capacity to wound by cutting. The objects of the invention are to provide an apparatus which can be operated at a low cost; which case hardens the glass uniformly so that the surface thereof shows no marks indicative of the practice of the process thereon; and which can be satisfactorily applied using low pressure air as a cooling medium. Certain embodiments of the invention are illustrated in the accompanying drawings, wherein:

Fig. 1 is a horizontal section on the line I—I of Fig. 2. Fig. 2 is a vertical section on the line II—II of Fig. 1. Fig. 3 is an end view. Fig. 4 is an enlarged detailed section. Fig. 5 is a section on the line V—V of Fig. 4. Fig. 6 is an enlarged detailed section on the line VI—VI of Fig. 2. Fig. 7 is a detailed section showing a modified form of device for supporting the glass sheets. Figs. 8 and 9 are plan and side elevation views of a modification, and Fig. 10 is a view similar to that of Fig. 1 but showing a modification.

Referring to the general arrangement shown in Figs. 1, 2, and 3; 1 is a car or carrier for supporting the glass to be case hardened in a vertical position mounted upon the track 3; 4 is an electric furnace into which the car is adapted to be moved for giving the glass its heat treatment; 5—5 are fan blowers, driven from the motors 6—6 and discharging into headers 7—7 on opposite sides of the line of travel of the car, and provided with nozzles 8; and 9 is an oscillating link for moving the car during the cooling operation, such link being moved from the motor 10 through the intermediary of the reducer 11, the crank 12, the link 13, and the lever 14.

The furnace 4, in which the glass is heated preliminary to the chilling operation, is divided in two parts by the slot 15 to permit the passage of the car carrying the glass therethrough. It is constructed of suitable refractory mounted in the angle iron frame members 17, and is heated by means of the units 18 imbedded in the refractory adjacent the surface thereof and supplied with current from the leads 19—19. The furnace might be heated by any other suitable means which will bring the glass up to approximately the softening point.

The frame work of the car which carries the glass sheet is in the form of parallel bars 20—20 at the sides and bottom with a single bar 21 at the top. The members 20—20 at the sides and bottom of the car carry a seal, preferably in the form of a sheet of asbestos 22, shaped to circular cross section, as indicated in Fig. 6, and held by means of rivets 23. The transverse dimension of the seal 22 is such that when the car is positioned in the furnace and the edges of such car lie in the slot 15, the sides of the member 22 yieldingly engage walls of the slot, and thus form a seal. The car thus forms its own seal for the slot by means of which it enters and leaves the furnace, and the efficiency of the heating apparatus is increased.

The preferred means for supporting the glass sheet 2 so that it can expand and contract freely during the heating and cooling operations is constructed as shown in Figs. 4 and 5. The bottom of the sheet rests upon a plurality of members 24 mounted for sliding adjustment along the frame member 20, such members having V shaped recesses 25 in their upper edges for receiving the edge of the glass sheet. The upper edge of the glass is supported by members 26 slidably mounted on the bar 27, and provided at their lower edges with the V shaped grooves 28. The members 26 have a limited vertical movement on the bar 27 and rest by gravity upon the upper edge of the sheet so that the glass is free to move vertically but at the same time is always held by the members 24 and 26. At the sides of the glass sheet, vertical bars 29 are provided, carrying the holding members 30. These holding members are mounted upon pivots 31 and are prevented from moving past a horizontal position by the stop pins 32. The edges of these members are also provided with V grooves. The members normally occupy the inclined position shown in Fig. 4, and when in this position permit the free movement of the edge of the glass sheet as such sheet expands. As the sheet contracts, the members follow the edge of the sheet by gravity. In this manner the sheet is securely held at all times, and at the same time it is free to expand and contract.

After the glass sheet is heated to a point approximating softness, the car carrying the sheet is moved to the right out of the furnace and between the headers 7—7, so that the air jets from the nozzles 8 play upon the surfaces of the glass sheet and cool it rapidly, thus giving a surface hardening. The nozzles may be variously proportioned and arranged. One form which has proven satisfactory, employs (½) one-half inch pipes about five (5) inches long, spaced two (2) inches from center to center, with their ends about seven eighths (⅞) of an inch from the faces of the glass sheet. With the arrangement, a satisfactory cooling may be secured with the relatively low air pressure produced by a fan blower. In case hardening one-quarter (¼) inch glass, satisfactory results may be secured with four ounces of pressure. When thinner glass is used a higher pressure is required. With thicker glass, such as one-half (½) inch, only one ounce of pressure is required. The spacing of the nozzle pipes permits the air striking the surfaces of the glass plate to escape freely to the rear, so that relatively rapid cooling can be secured with a low air pressure, so that economy in the use of air is secured as compared with constructions heretofore employed using high air pressure and perforated grid or header constructions which make no provisions for the escape of the back flowing air, such as provided by the spaced nozzle tubes. The low pressure air as thus supplied also reduces the tendency to produce a mottled appearance in the glass such as is produced where high pressure air is employed, this result being due to the better distribution of the air over the surface of the glass.

In order to still better distribute the air over the surfaces of the sheet, the oscillating link 9 is provided driven from the motor 10 as heretofore described. This link is provided with a notch 33, at its free end, adapted to engage the axle 34 of the car when the link is swung upward from the position shown in Fig. 2. The movement of the link upward to engage the axle 34 is done by means of a cam 35 carried by an axle 36 having an operating handle 37 (Fig. 1).

Figs. 8 and 9 illustrate a modified form of header and nozzle. The header 38 is in this case provided with nozzles 39 which extend vertically the length of the header and are provided with outlet slots of corresponding lengths. This header is supplied with air in the same manner as the headers 7—7, and in order to permit of a free back flow of the air after it strikes the surface of the glass the slots 40 are provided between the elongated nozzles. This construction also permits of a use of the relatively low pressure air such as may be easily supplied from a fan blower, so that no air compressor is required and relatively good economy is secured, as compared with constructions heretofore used employing compressors and high pressure air.

If desired, the plates 2 may be supported from the upper edges, as indicated in Fig. 7, a pair of links 41—41 being provided pivoted from the frame member 42 and held in gripping position by means of a slip ring 43. This provides a very simple means for supporting the glass plates, but has the objection that slots must be provided in the edge of the sheet to receive the ends of the members 41—41. This is a matter of additional expense, and the marring of the sheet is somewhat objectionable; so that the construction shown in Figs. 4 and 5, for supporting the sheets, is preferred.

Fig. 10 shows a modified general arrangement which differs from that of Figs. 1, 2, and 3, in that a series of heating chambers 44—44—44 are employed instead of the single chamber of the Fig. 1 construction. These chambers are heated electrically, as heretofore described, and the glass is carried through on cars similar to those heretofore described. The sheets as they emerge pass between the headers 7—7 corresponding to those heretofore described, the operation at this point being the same as in the Fig. 1 construction. The cars carry the sheets and pass through the heating chambers in a continuous series or train, the last car in the series being forced out of the chamber at the right and between the headers 7—7 as a new car is added to the left end of the series and moved into the chamber at the left of the series.

What I claim is:

1. In combination in apparatus for case hardening glass sheets, a heating furnace having slots through its side and bottom walls, a track extending beneath the bottom slot in alinement therewith, a car mounted on the track and adapted to support a glass sheet in a vertical position and to be moved along the track through said slots and the furnace, and sealing means on the car arranged to close said slots when the car is moved completely into the furnace.

2. In combination in apparatus for case hardening glass sheets, cooling apparatus comprising means for carrying a glass sheet in vertical position horizontally, headers on opposite sides of the line of movement of said means, a plurality of uniformly spaced nozzle members carried by each header and projecting at right angles to said line of movement, means for supplying air to the headers, and means for oscillating the means for carrying the glass sheet while such sheet lies between the sets of nozzles.

3. In combination in apparatus for case hardening glass sheets, cooling apparatus comprising means for carrying a glass sheet in vertical position horizontally, headers on opposite sides of the line of movement of said means, and having vertically extending outlet slots, means for supplying air to the headers, and means for oscillating the means for carrying the glass sheet while such sheet lies between the sets of nozzles.

4. In apparatus for case hardening glass sheets, a frame for carrying the sheets in a vertical frame during the heating and cooling steps, comprising a fixed support for the bottom of the sheets, and means for engaging the side edges of the sheets as the sheets expand and contract, comprising members pivoted at their inner ends to the frame for vertical movement and having recessed outer ends adapted to engage said side edges, and which occupy upwardly inclined positions when in such engagement so that they will rise as the sheets expand and fall by gravity as the sheets contract.

5. In apparatus for case hardening glass sheets, a frame for carrying the sheets in a vertical frame during the heating and cooling steps, comprising a fixed support for the bottom of the sheets, and means for engaging the side edges of the sheets as the sheets expand and contract, comprising members pivoted at their inner ends to the frame for vertical movement and having recessed outer ends adapted to engage said side edges, and which occupy upwardly inclined positions when in such engagement so that they will rise as the sheets expand and fall by gravity as the sheets contract, the recesses in said members being of V-shape form so that they will not contact with the side faces of the sheets.

6. In apparatus for case hardening glass sheets, a frame for carrying the sheets in a vertical frame during the heating and cooling steps, comprising a fixed support for the bottom of the sheets, and means for engaging the side edges of the sheets as the sheets expand and contract comprising pivoted members inclined upwardly and having V shape recesses in gravity engagement with said edges so that they will rise as the sheet expands, and fall as the sheet contracts.

7. In combination in apparatus for case hardening glass, a pair of opposing headers having upright faces spaced apart, a plurality of nozzles distributed over the faces of each header with the outer ends spaced apart to receive a glass sheet to be cooled, and fan blower means for supplying low pressure air to the headers, said nozzles having a length several times the diameter thereof and spaced apart so as to permit the air supplied by the nozzles and impinging upon the glass sheet to escape freely to the rear between the nozzles.

8. In combination in apparatus for case hardening glass, a pair of opposing headers having upright faces spaced apart, a plurality of nozzles distributed over the faces of each header with their outer ends spaced apart to receive a glass sheet to be cooled, and fan blower means for supplying low pressure air to the headers, said nozzles having a length upward of five times the diameter thereof and spaced apart so as to permit the air supplied by the nozzles and impinging upon the glass sheet to escape freely to the rear between the nozzles.

9. In combination in apparatus for case hardening glass sheets, a heating furnace having slots through its side and bottom walls, a track extending beneath the bottom slot in alignment therewith, a car mounted on the track and adapted to support a glass sheet in a vertical position and to be moved along the track through said slots and the furnace, headers on opposite sides of the line of movement of the car above the track so that the glass sheets are carried between such headers after passing through the heating furnace, nozzles carried by the headers and projecting at right angles to the line of movement of the car, and means for supplying air under pressure to the headers.

10. In combination in apparatus for case hardening glass sheets, a heating furnace having slots through its side and bottom walls, a track extending beneath the bottom slot in alignment therewith, a car mounted on the track and adapted to support a glass sheet in a vertical position and to be moved along the track through said slots and the furnace, and sealing means on the car arranged to close said slots through the side walls of the furnace when the car is moved completely into the furnace.

LLOYD V. BLACK.